(12) United States Patent
Ramabhadran et al.

(10) Patent No.: US 11,417,322 B2
(45) Date of Patent: Aug. 16, 2022

(54) TRANSLITERATION FOR SPEECH RECOGNITION TRAINING AND SCORING

(71) Applicant: Google LLC, Mountain View, CA (US)

(72) Inventors: Bhuvana Ramabhadran, Mount Kisco, NY (US); Min Ma, New York, NY (US); Pedro J. Moreno Mengibar, Jersey City, NJ (US); Jesse Emond, New York, NY (US); Brian E. Roark, Portland, OR (US)

(73) Assignee: Google LLC, Mountain View, CA (US)

( * ) Notice: Subject to any disclaimer, the term of this patent is extended or adjusted under 35 U.S.C. 154(b) by 157 days.

(21) Appl. No.: 16/712,492

(22) Filed: Dec. 12, 2019

(65) Prior Publication Data

US 2020/0193977 A1 Jun. 18, 2020

Related U.S. Application Data

(63) Continuation of application No. PCT/US2019/017258, filed on Feb. 8, 2019.

(60) Provisional application No. 62/778,431, filed on Dec. 12, 2018.

(51) Int. Cl.
| | | |
|---|---|---|
| *G10L 15/19* | (2013.01) | |
| *G10L 15/06* | (2013.01) | |
| *G10L 15/16* | (2006.01) | |
| *G10L 15/22* | (2006.01) | |
| *G06N 3/08* | (2006.01) | |
| *G06N 3/04* | (2006.01) | |

(52) U.S. Cl.
CPC ............ *G10L 15/19* (2013.01); *G10L 15/063* (2013.01); *G10L 15/16* (2013.01); *G10L 15/22* (2013.01); *G06N 3/0445* (2013.01); *G06N 3/084* (2013.01)

(58) Field of Classification Search
CPC ....... G10L 15/19; G10L 15/063; G10L 15/16; G10L 15/22; G06N 3/0445; G06N 3/084
See application file for complete search history.

(56) References Cited

U.S. PATENT DOCUMENTS

| | | | | |
|---|---|---|---|---|
| 2008/0221866 | A1* | 9/2008 | Katragadda | G06F 40/45 704/8 |
| 2009/0326914 | A1* | 12/2009 | Joy | G06F 40/129 704/3 |
| 2010/0106484 | A1* | 4/2010 | U | G06F 40/129 704/5 |
| 2014/0039879 | A1* | 2/2014 | Berman | G06F 40/284 704/9 |
| 2014/0095143 | A1* | 4/2014 | Jan | G06F 40/129 704/2 |

(Continued)

*Primary Examiner* — Michael Colucci
(74) *Attorney, Agent, or Firm* — Honigman LLP; Brett A. Krueger

(57) ABSTRACT

Methods, systems, and apparatus, including computer programs stored on a computer-readable storage medium, for transliteration for speech recognition training and scoring. In some implementations, language examples are accessed, some of which include words in a first script and words in one or more other scripts. At least portions of some of the language examples are transliterated to the first script to generate a training data set. A language model is generated based on occurrences of the different sequences of words in the training data set in the first script. The language model is used to perform speech recognition for an utterance.

19 Claims, 3 Drawing Sheets

Illustration of transliteration between Devanagari and Latin scripts for the English word *browser*

(56) References Cited

U.S. PATENT DOCUMENTS

| | | | |
|---|---|---|---|
| 2014/0163952 A1* | 6/2014 | Brawer | G06F 40/129 704/5 |
| 2017/0371850 A1* | 12/2017 | Mukhopadhyay | G06F 40/242 |
| 2018/0011842 A1* | 1/2018 | Waibel | G10L 15/22 |
| 2018/0061417 A1* | 3/2018 | Radadia | G10L 15/26 |
| 2019/0005945 A1* | 1/2019 | Hofer | G06N 3/0445 |

* cited by examiner

WER, toWER and correlation with the percentage of code-switching measured as the percentage of Latin in the data

TRANSLITERATION FOR SPEECH RECOGNITION TRAINING AND SCORING

CROSS-REFERENCE TO RELATED APPLICATIONS

This application is a continuation of International Application No. PCT/US2019/017258, filed Feb. 8, 2019, which claims the benefit of Provisional Application No. 62/778,431, filed Dec. 12, 2018, the contents of each are incorporated by reference herein.

BACKGROUND

Many instances of spoken and written language include words from two or more different languages or dialects. Many speech recognition systems have difficulty accurately transcribing speech that combines words from different languages or dialects. Similarly, it is often difficult to train speech recognition systems using written language examples that include words in different languages or dialects, and especially language from multiple writing systems.

SUMMARY

In some implementations, language examples can be processed to transliterate at least some words into a different script to enhance training of speech recognition models and to provide more accurate evaluation of speech recognition models. In some instances, written language examples, such as those used to train or test a language model, may include words written in one script (e.g., a first script or primary script) as well as one or more words in a different script. Before training or evaluating a model, language samples can be normalized by transliterating out-of-script words into the primary script. This can be done for all out-of-script words or more selectively (e.g., by not transliterating proper names). The resulting model provides better accuracy than models that exclude examples with mixed scripts from training and models that use mixed scripts without transliteration.

In general, the use of multiple scripts in a single phrase or sentence may make it difficult for a language model to appropriately learn the proper use of the words that are not in the main script. As a result, examples with mixed scripts are conventionally removed from training data sets so that they are not used in language model training. This has the disadvantage of limiting the amount of examples the model can learn from, and in particular, removing the opportunity for the model to learn the context and usage for instances where words in multiple scripts are used together. To improve recognition accuracy, transliteration may be used to normalize training data sets for a desired script, resulting in improved accuracy of modeling.

Transliteration of the language model training data reduces inconsistency in transcription, provides better normalization and improves the overall performance of the automatic speech recognizer system. This feature allows the language model training data to be augmented, and enforces the recognizer's hypotheses to conform to one writing system. By contrast, if model training simply allowed all speech of a secondary writing system in training, the resulting model would tend to output more speech in the secondary writing system, further increasing the already present writing script mismatch between the model hypothesis and the transcript truth. It would also diffuse word counts across two or more representations, e.g., the word in the first script as well as the word in the second script, even though both refer to the same semantic meaning and pronunciation. By transliterating the training data, model output is maintained predominantly in the desired script, while increasing accuracy due to word counts for the same word being combined for instances in any script.

In some implementations, a method performed by one or more computers includes: accessing a set of data indicating language examples for a first script, where at least some of the language examples include words in the first script and words in one or more other scripts; transliterating at least portions of some of the language examples to the first script to generate a training data set having words transliterated into the first script; and generating a speech recognition model based on the occurrences of sequences of words in the training data set having words transliterated into the first script. The method may optionally further include using the speech recognition model to perform speech recognition for an utterance.

In some implementations, the speech recognition model is a language model, an acoustic model, a sequence-to-sequence model, or an end-to-end model.

In some implementations, transliterating comprises mapping different tokens that represent text from different scripts to a single normalized transliterated representation.

In some implementations, transliterating the language examples comprises transliterating words in the language examples that are not in the first script into the first script.

In some implementations, transliterating the language examples comprises: accessing a blacklist of terms in a script different from the first script; and bypassing transliteration of instances of terms from the blacklist that occur in the language examples.

In some implementations, transliterating the language examples comprises generating altered language examples in which words written in a second script different from the first script are replaced with one or more words in the first script that approximate acoustic properties of the word in the first script.

In some implementations, the words written in the second script are individually transliterated into the first script on a word-by-word basis.

In some implementations, the method includes: determining a test set of language examples with which to test the speech recognition model; generating a normalized test set by transliterating into the first script words of the language examples in the test set that are not written in the first script; obtaining output of the speech recognition model corresponding to the language examples in the test set; normalizing output of the speech recognition model by transliterating into the first script words of the speech recognition model output that are not written in the first script; and determining an error rate of the speech recognition model based on a comparison of the normalized test set with the normalized speech recognition model output.

In some implementations, the error rate is a word error rate, and wherein the method includes, based on the word error rate: determining whether to continue training or terminate training of the speech recognition model; altering a training data set used to train the speech recognition model; setting a size, structure, or other characteristic of the speech recognition model; or selecting one or more speech recognition models for a speech recognition task.

In some implementations, the method includes determining a modeling error rate for the speech recognition model in which acoustically similar words written in any of multiple scripts are accepted as correct transcriptions, without penalizing output of a word in a different script than a corresponding word in a reference transcription.

In some implementations, the method includes determining a rendering error rate for the speech recognition model that is a measure of differences between a script of words in the output of the speech recognition model relative to a script of corresponding words in reference transcriptions.

In some implementations, transliterating is performed using a finite state transducer network trained to perform transliteration into the first script.

In some implementations, transliterating comprises, for at least one language example, performing multiple rounds of transliteration between scripts to reach a transliterated representation in the first script that is included in the training data set in the first script.

In some implementations, the method includes determining a score indicating a level of mixing of scripts in the language examples; and based on the score: selecting a parameter for pruning a finite state transducer network for transliteration; selecting a parameter for pruning the speech recognition model; or selecting a size or structure for the speech recognition model.

In some implementations, generating the speech recognition model comprises: after transliterating at least portions of some the language examples to the first script, determining, by the one or more computers, a count of occurrences of different sequences of words in the training data set in the first script; and generating, by the one or more computers, a speech recognition model based on the counts of occurrences of the different sequences of words in the training data set in the first script.

In some implementations, the speech recognition model comprises a recurrent neural network, and generating the speech recognition model comprises training the recurrent neural network.

The present disclosure also provides a method of performing speech recognition, including: receiving, by one or more computers, audio data representing an utterance; and using, by the one or more computers, the speech generation model to map the audio data to text (or some other symbolic representation) representing the utterance, where the speech recognition model has been previously generated in accordance with any of the disclosed herein. It will be appreciated that the computers used to generate the speech recognition model may be different from those used to perform speech recognition. The method may further include outputting the text representing the output.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
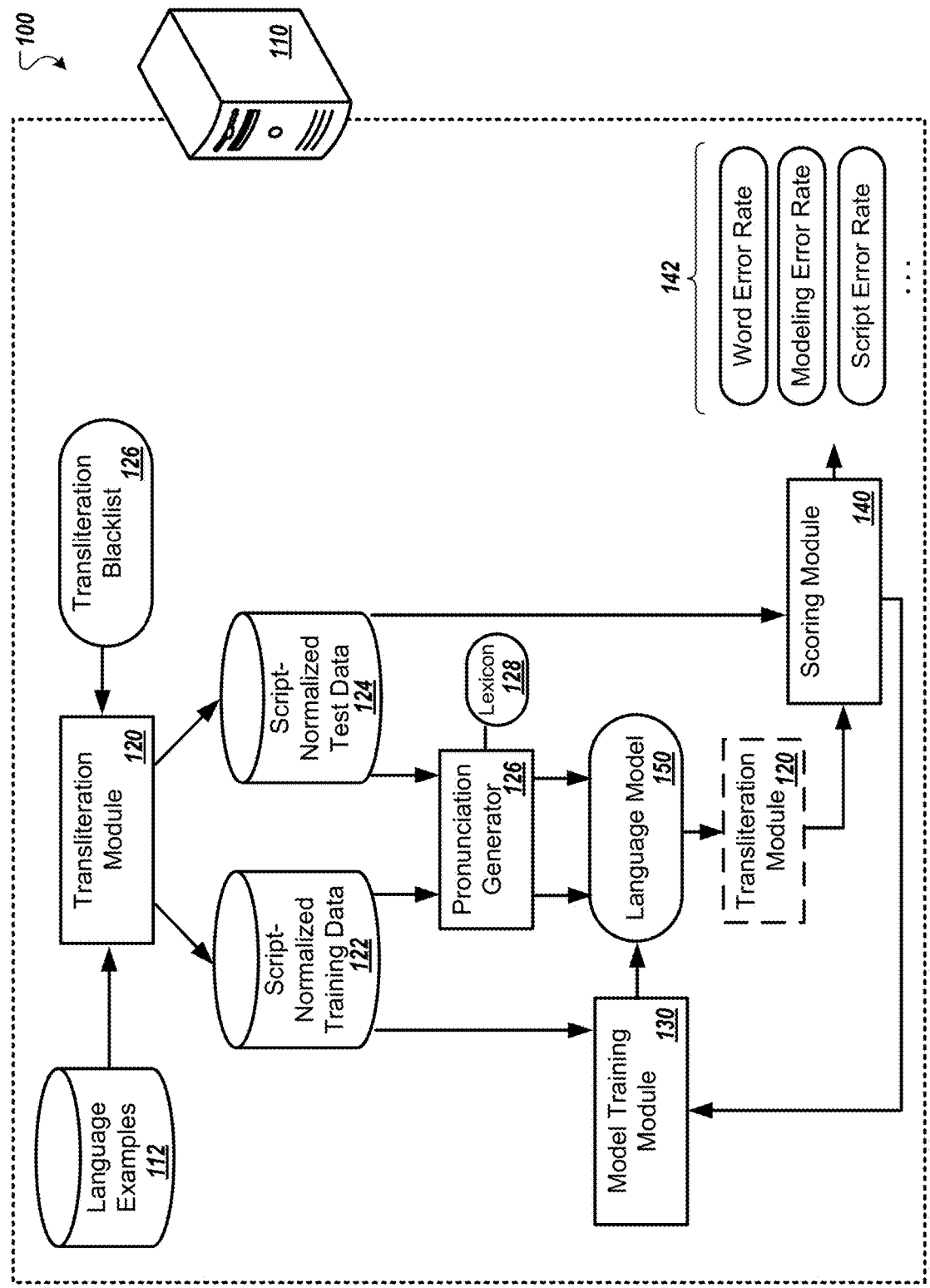
FIG. 1 is a block diagram that illustrates an example of a system for transliteration for speech recognition and evaluation.

FIG. 1 is a diagram that illustrates an example of a system 100 for transliteration for speech recognition and evaluation. The system includes a computer system 110, which may include one or more computers located together or remotely from each other. The computer system 110 has a transliteration module 120, a model training module 130, and a scoring module 140. In the example of FIG. 1, the system 100 is used to train and evaluate a speech recognition model, such as language model 150.

In the example, a set of language examples 112 are obtained from any of various sources, such as query logs, web pages, books, human or machine recognized speech transcriptions, and so on. The language examples 112 are primarily in a first script. As used herein, the term "script" generally refers to a writing system. A writing system is a system of symbols that are used to represent a natural language. Examples of scripts with which the techniques disclosed herein can be used include Latin, Cyrillic, Greek, Arabic, Indic, or another writing system. The language model 150 will be trained to provide output primarily representing text in a first script. Nevertheless, there are often instances where a phrase or sentence primarily written in one script includes one or more words written using another script. The language examples 112 typically include mostly examples written purely in the first script, but also includes some language examples that include a combination of words in another script as well as words in the first script.

The transliteration module 120 processes the language examples 112 to generate normalized data sets for the first script. Before training the language model 150, the transliteration module 120 processes the language examples 112 to transliterate instances of words not in the first script into the first script. The transliteration module 120 can use finite state transducer (FST) networks to perform the transliteration. The relationships between graphemes and words of different scripts can be learned through analysis of the language examples 112 or from other data. In some implementations, transliteration is done separately for each individual word, e.g., on a word-by-word basis, to achieve a high quality correspondence in the transliteration. The process may optionally take into consideration the context of surrounding words to provide transliterations with high accuracy. Through the transliteration process, the resulting word as transliterated into the first script can be one having a pronunciation that matches or closely approximates the pronunciation of the corresponding original word that occurs in the language examples 112. Thus the transliteration process can change the writing system for original words not originally written in the first script, with the replacement words in the first script representing the same or similar acoustic characteristics or sounds as the original words.

In some implementations, all words that are not in the first script are transliterated into the first script. In other implementations, transliteration is done selectively. For example, a transliteration blacklist 126 can indicate words or phrases that should not be transliterated. The transliteration module 120, and so the transliteration module 120 keeps these terms in their original script when generating training data and test data, even though the original script differs from the first script. The blacklist may be particularly helpful to include proper names, e.g., for people, locations, companies, and other entities, which may be more common or more recognizable in their native writing system compared to transliterated versions. For example, it may be preferred for some names such as "George Washington," "New York," or "Google" to remain in Latin script even among text that is predominantly in another script such as Indic, Cyrillic, Hanzi, Kana, Kanji, etc. Including out-of-script words in the training data set can allow the language model 150 to learn to predict output of these words in their native scripts, even though the scripts are different from the dominant script.

From the language examples 112, the transliteration module 120 generates script-normalized training data 122 for training the language model 150. The transliteration module 120 also generates script-normalized test data 124 to be used in testing the language model 150. Testing may occur at various stages, for example, after certain amounts of testing have been completed. The language model 150 may be tested repeatedly, between training processes, until a desired level of performance is achieved.

In some implementations, the language model 150 is configured to receive, as input, data representing the acoustic or linguistic units representing a language sequence, e.g., data indicating a pronunciation of a language sequence. For example, the input may indicate a series of phones (which may be context-dependent or context-independent), or a distribution of scores for a set of phones. These pronunciations can be determined for language examples 112 in any of multiple ways. For language examples for which audio data is available, the pronunciation may be output of an acoustic model for the audio data. For language examples where there is no corresponding audio data, such as examples from web pages, books, keyboard-entered queries, etc., the system can use a pronunciation generator 126 to generate a pronunciation automatically from written text. The pronunciation generator 126 can access a lexicon 128 that indicates pronunciations of words in the language(s) of the language examples 112, e.g., mappings of grapheme sequences to phoneme sequences, to perform a grapheme-to-phoneme conversion. In addition, for some language examples, words may have pronunciations provided by manual annotation from linguists.

Although FIG. 1 shows a pronunciation generator 126 and lexicon 128, these elements are optional in some implementations. For example, language examples 112 may be received that already have corresponding pronunciations associated with the text. Also, in some implementations, the language model 150 does not receive linguistic unit information as input, but instead simply receives data indicating a sequence of graphemes or words. For example, some language models may be used for second-pass re-scoring of candidate transcriptions, and so may receive data indicating a proposed sequence of words. The language model in this scenario may receive data indicating the words themselves, and not linguistic units of a pronunciation, and may be configured to provide scores indicating how likely the overall sequence is given the training of the language model.

The model training module 130 performs training of the language model 150. For example, the language model 150 can be a statistical language model, such as an n-gram model, that is generated based on counts of occurrences of different words and phrases in the script-normalized training data 122. Other types of models, such as neural network models, may additionally or alternatively be used. For example, the language model 150 can include a neural network which the model training module 130 trains using backpropagation of errors, stochastic gradient descent, or other techniques. The neural network may be a recurrent neural network such as one including one or more layers having long short-term memory (LSTM) cells. The model may be trained by minimizing an objective function such as connectionist temporal classification (CTC) objective function, a state-level minimum Bayesian risk (sMBR) objective function, or another objective function.

In general, the language model 150 is trained to predict, e.g., indicate relative likelihoods of occurrence, of words at least in part based on a linguistic context, e.g., one or more surrounding words or phrases. Thus, the language model 150 may be configured to provide outputs that indicate probabilities that different words in a vocabulary will occur given the occurrence of one or more immediately preceding words. The prediction can also be based on acoustic or linguistic units, such as a pronunciation indicating a sequence of phones or output of a language model. When used with an acoustic model that indicates the sounds present in speech, e.g., as phones or other linguistic units, the language model 150 can indicate which words and word sequences best represent those sounds, according to the patterns of actual language usage observed from the script-normalized training data 122. The language model 150 can be used to generate scores, e.g., probability scores or confidence scores, indicating the relative likelihood that different words would follow each other, which can be used to generate a speech lattice and then a beam search process can be used to determine the best path, e.g., a highest-scoring or lowest-cost path, through the lattice that represents the transcription considered most likely.

After training or during training, the scoring module 140 is used to evaluate the accuracy of the language model 150. The result of the evaluation includes the generation of one or more scores 142 indicative of the performance of the language model 150. The scoring module 140 can provide examples from the script-normalized test data 124 as input to the language model 150, causing the language model 150 to generate outputs, e.g., predictions or probability scores, for each input example. The outputs of the language model may be further processes, e.g., using a lattice and beam search or through other techniques, to generate a language sequence output for each input example.

Optionally, words in the output sequences that are not in the first writing system are transliterated using the transliteration module 120 (which is duplicated in the figure for clarity in illustration). For a language model 150 generated as discussed above, the model 150 learns to indicate only words in the dominant first script, except for words in the blacklist 126. As a result, the model so trained will indicate output sequences that are in the first script. Nevertheless, for a more generalized approach and to allow evaluation of all types of language models including those not trained under the same conditions or data sets, transliteration can be used to normalize output sequences for more accurate comparison.

The scoring module 140 can generate a word error rate that indicates the rate that the output sequences include different words than the original language examples 112. However, a conventional word error rate calculation would consider a word to be incorrect if it is in a different script than the original, even if the two words are equivalent as transliterations of each other (e.g., representing the same sounds and semantic meaning). When switching between languages and writing systems is common, this can artificially inflate the apparent error rates when the model has, in effect, predicted the correct word. To avoid this and other inaccuracies, the scoring module 140 can generate a revised word error rate, referred to as a modeling error rate, that compares output sequences normalized into the first script with test data 124 normalized into the first script. As a result, an error is not counted when the language model 150 produces a language sequence entirely in the first script even though the original language example had one or more equivalent words written in a different script. A separate score, a script error rate, is generated to measure the rate at which the script of the output sequence differs from the script of the original language example 112.

The evaluation scores 142 from the scoring module 140 can be provided for output to a user and can also be used to manage the training of the language model 150. For example, the modeling error rate can be used to determine whether to continue training or terminate training of the language model 150. Training may be set to continue until the error rate is below a threshold level. As another example, based on one or more of the error rates, the computer system 110 may alter a training data set used to train the language model 150, for example, to bring in a different or expanded data set to achieve better accuracy. As another example, based on one or more of the scores 142, the computer system 110 may set a size, structure, or other characteristic of the language model 150. As another example, based on the evaluation of the language model 150 and potentially scores for evaluating one or more other language models, the computer system 110 may select one or more language models to be used to perform a speech recognition task.

In some implementations, other scores are determined and used to adjust training of the language model 150 and/or the transliteration module 120. For example, the computer system 110 can obtain data indicating a rate at which mixed use of script, e.g., "code-switching," occurs for a language generally or in a specific data set (such as the language examples 112). With this score, the system may select a parameter for pruning a finite state transducer network for transliteration, may select a parameter for pruning the language model, and or select a size or structure for the language model. In fact, many different parameters for the structure, training, and operation of the language model 150 can be set using the scores including a choice of a development set of data (e.g., a validation set used to tune the training algorithm and prevent overfitting), a training data set, a model size, a learning rate during training, a type of model used (e.g., n-gram, neural network, maximum entropy model, etc.), or a set of output targets for the model (e.g., to predict words, word pieces, or graphemes).

In general, the techniques in the application can be used to train and test any of various different types of models, not only language models. For example, transliterated data can be used to train and score a language model, an acoustic model, a sequence-to-sequence model, and/or an end-to-end model (e.g., one that receives acoustic information or features and provides output indicating likelihoods of words, word pieces, or graphemes). The sequence-to-sequence model can map an input sequence to an output sequence. For example, a sequence-to-sequence model can receive acoustic information or features representing of one or more spoken words, and produce a symbolic output (e.g. text) that represents those words.

Code-switching is a commonly occurring phenomenon in many multilingual communities. Code-switching generally refers to a speaker switching between languages within a single utterance. Conventional Word Error Rate (WER) measures are not sufficient for measuring the performance of code-mixed languages due to ambiguities in transcription, misspellings and borrowing of words from two different writing systems. These rendering errors artificially inflate the WER of an Automated Speech Recognition (ASR) system and complicate its evaluation. Furthermore, these errors make it harder to accurately evaluate modeling errors originating from code-switched language and acoustic models. As discussed further below, a new metric, transliteration-optimized Word Error Rate (toWER) can smooth out many of these irregularities by mapping all text to one writing system.

These techniques can also be used to improve acoustic and language modeling for bilingual code-switched utterance. Examples discussing Indic languages are discussed in detail, although the techniques may be used for any combination of languages and writing systems. The transliteration approach can be used to normalize data for three types of language models, namely, a conventional n-gram language model, a maximum entropy based language model and a Long Short Term Memory (LSTM) language model, and a state-of-the-art Connectionist Temporal Classification (CTC) acoustic model. The robustness of the proposed approach is demonstrated on several Indic languages from voice search traffic with significant gains in ASR performance, e.g., up to 10% relative over the state-of-the-art baseline.

Code-switching is common among bilingual speakers of Hindi-English, Bengali-English, Arabic-English and Chinese-English, among many others. When a word from a foreign language (e.g., English) becomes part of the vocabulary of a native language (e.g., Hindi), the distinction between code-switching, loan words, and creation of new words in the lexicon of the native language is often not very clear, and falls on a continuum. This phenomena renders the transcription of code-switched speech difficult and inconsistent, resulting in the same word being transcribed using different writing systems. These inconsistencies can lead to incorrect count distributions among words with similar acoustic and lexical context in both acoustic and language models.

Several approaches have been suggested for code-switched speech recognition. One approach is the use of multi-pass speech recognition, wherein regions of codeswitching are first identified with language identification methods that use acoustic information only. Subsequently, the speech segments are recognized using the corresponding monolingual acoustic and language models, potentially with second pass merging and rescoring. Such methods not only require multiple passes of processing, but also rely on the accuracy of code-switch detection and language identification. They also fail to capture the context information at the code-switch boundaries. Other approaches require constraints such as a unified phonetic alphabet across multiple languages, modeling pronunciation variation in lexicons, and other techniques which do not consistently improve speech recognition performance.

The techniques herein provide a new strategy based on transliteration for improving ASR performance. weighted finite state transducers (WFSTs) have been used for speech recognition decoding, where WFSTs representing a context-dependent phone sequence model (C), the pronunciation lexicon (L) and the language model (G) can be composed into a single large transducer (C ∘ L ∘ G, or CLG for short) that maps context-dependent phone sequences to word sequences. In code-switched languages, the speaker mixes Romanized sequences with native language scripts, such as Devanagari in the case of Hindi. The processing flow takes a similar approach, using transliteration modeling in both the acoustic and language models to capture the code-switches. A series of WFST optimizations provide improvements to achieve the accuracy, latency, and memory usage operating points to operate effectively and efficiently. Importantly, the system demonstrates significant gains in ASR performance for Indic languages using a transliteration based approach.

Some of the challenges in speech recognition of Indic languages are discussed below. A new metric, transliteration optimized Word Error Rate (toWER) is introduced, along with the proposed approach and WSFT optimizations. Then, using Hindi as an example, the importance of evaluating ASR systems by eliminating code-switches is discussed, as well as a discussion of scoring in a common transliterated space. Significant performance improvements can be achieved when incorporating transliteration into the training of acoustic and language models. Finally, the generality of the proposed approach is validated with examples for other Indic languages.

While the techniques in this document are applicable to code-switching between any two languages, Indic languages present particularly interesting challenges. In India, bilingualism is commonplace and code switching between the native language and English occurs frequently. Table 1 shows the distribution of Latin script seen in two of the corpora used in building language models for Indic languages. The corpus containing typed search queries contains far more Latin than the corpus containing transcriptions of spoken queries. This seems to be due to transcription conventions that transcribers tried to adhere to, while web-based search queries are not restricted in any manner.

TABLE 1

Distribution of Latin script in Indic languages across two different corpora containing written and spoken queries

| Language | Fraction of Latin in written queries (%) | Fraction of Latin in spoken queries (%) |
|---|---|---|
| Hindi | 58.36 | 11.54 |
| Bengali | 71.37 | 16.17 |
| Kannada | 81.19 | 1.76 |
| Gujarati | 79.69 | 9.74 |
| Tamil | 71.41 | 4.14 |
| Malayalam | 75.48 | — |
| Urdu | 5.14 | — |
| Marathi | 81.63 | 6.49 |

TABLE 2

Examples containing Devanagari and Latin writing systems Table 1 illustrates the widespread distribution of code-switching.

| | |
|---|---|
| हेब्रो Hi | Hello Hi |
| एटेल 4G मोबिल् | Airtel 4G Mobile |
| सम्सुन्ग् J2 का rate | Samsung J2 ka rate |
| Satta Matka डाट् काम् साइट् | Satta Matka dot com site |
| MP3 रिंग् टोन् नू | MP3 Ring Tone new |
| Robot 2 फ़िल्म् HD | Robot 2 film HD |

A detailed analysis of the proposed approach is discussed below using Hindi, which is one of the languages with a large number of code-switches and training data, while illustrating the generalization of the approach and its impact on other Indic languages as well.

Code-switching is present in multiple writing systems. For example, Hindi uses the Devanagari script, while Urdu uses an Arabic writing system. As most speakers of Hindi are bilingual, codeswitching is a part of daily life, the phenomenon routinely occurs in casual conversations, voice search queries and in presentations, leading to what is commonly referred to as Hinglish. This type of code-switching can occur within a sentence at a phrase level. A few examples of commonly transcribed spoken utterances are presented in Table 2. The first column illustrates the mixed writing systems used commonly. The second column shows the equivalent text in Latin script for ease of readability and to illustrate the mix of Hindi and English seen in the data. Despite instructions to transcribe Hindi words in Devanagari script and words of English origin in Latin script, numerous inconsistencies can be observed in the resulting transcriptions by bilingual transcribers. Hindi, like other Indian languages, is Romanized on social and news media, in user generated text, especially with named entity mentions, URLs, numeric entities and acronyms, thereby rendering the transcription of Hindi words in Devanagari even more difficult for the transcribers. These type of inconsistencies directly impact the definition of errors and the metric used for evaluating ASR systems, Word Error Rate (WER). These are referred to as rendering errors.

The variability in the usage of the native language (Hindi) and the foreign language (English) makes it challenging to model the context under which code switching occurs. While several methods that use linguistic, prosodic and semantic cues have been proposed to model and capture code-switching phenomena, very few methods have been proposed and been successful in improving the performance of ASR systems. The lack of consistency in transcription and incorrect normalization also impacts the modeling power of language and acoustic models. This type of error is referred to as modeling error. The techniques discussed next provide a unified approach to address both modeling and rendering errors.

Transliteration is the process of converting sequences from one writing system to another. Transliteration of Indic languages to Latin script is particularly challenging due to the large combination of consonants, vowels and diacritics that result in a non-unique mapping. It is worth noting that non-standard spellings exist in both scripts, for example, loaner words that have variable possible spellings in Devanagari and Hindi words with variable Romanizations.

Figure 2:
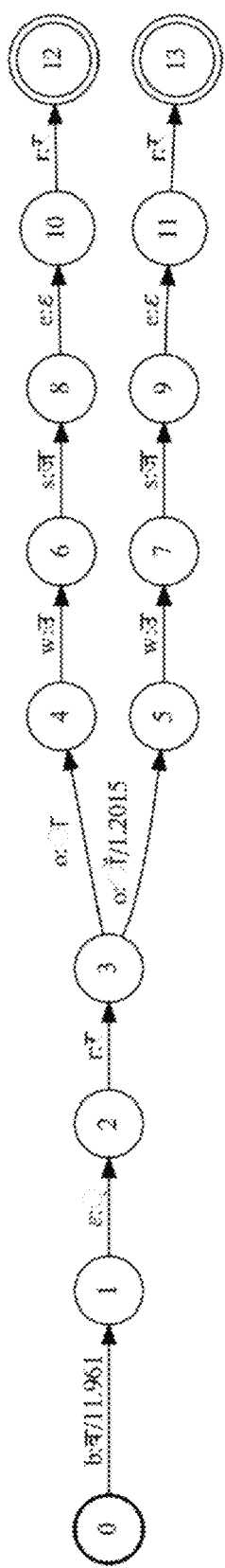
FIG. 2 is a diagram that illustrates an example of a finite state transducer network for transliteration.

A general transliteration approach is applicable to address code switching for any two languages or writing systems. Transliteration can be done effectively via a weighted finite state transducer. To generate source data, human transcribers were asked to transcribe spoken utterances in the native writing script (Devanagari, in this case) with exceptions for certain commonly used English words to be written in Latin script. Thus, the context and range of input from the two writing systems was restricted to what was said in the utterance, unlike unrestricted text entry via the keyboard. However, given the lack of canonical transliterations between the two writing systems and inconsistencies between transcriptions, a large number of modeling and rendering errors are introduced. To address this, the transliteration transducer, T is a composition of three transducers: I ○ P ○ O, where I maps input Unicode symbols to symbols in a pair language model, P is a bigram pair language model that maps between symbols in the two writing scripts, English and Devanagari, and O maps the pair language model symbols to the target output Devanagari symbols (illustrated in FIG. 2). The conditional probability of the transliterated word is obtained by dividing the joint probability from T by the marginalization sum over all input and output sequences. This computation is efficiently implemented by computing the shortest path in T.

In order to improve performance of transliteration with respect to memory, speed, and latency requirement for building large-scale language models, several optimizations can be made.

In some implementations, the transliteration transducer computes the shortest path, and significant speed improvements were obtained by the efficient pruning of the search space. All paths that score below the pruning threshold were discarded. This threshold was determined empirically so as to not affect ASR performance. A prune weight threshold of 5 was determined as a good operating point, particularly as the best path is the path of greatest interest.

In some implementations, the use of ϵ-transitions to reduce the number of deletions and insertions is important when reducing epsilon cycles in the WFST. A parallel implementation of epsilon removal was used, utilizing eight threads in parallel.

In some implementations, the operations for epsilon removal caused dramatic increases in memory use, rendering the transliteration process unusable for large-scale language models. This issue was addressed via weight-based pruning prior to epsilon removal with no impact on the transliteration performance.

In some implementations, given that the bilingual word usage distribution is far from uniform, several words reappeared very frequently in the training data. To take advantage of this, a cache of successful transliterations was introduced with a maximum size of 100K elements, thereby reducing transliteration of frequent terms to a table lookup.

The speed-up/memory reduction contributions from the above optimization steps are presented in Table 3. As an example, the above optimizations may reduce the overall training time of a language model trained on 280 billion words from 165 hours to 12 hours.

TABLE 3

Impact of various optimizations on transliteration speed computed over an utterance containing four words on average

| Optimization | Speed (msec) |
| --- | --- |
| Baseline | 123 |
| +transliteration transducer pruning | 109.0 |
| +parallel epsilon removal | 72.6 |
| + weight based pruning prior to epsilon removal | 61.6 |
| +caching frequent transliterations | 25.0 |

The experiments discussed below were conducted on training and test sets that were anonymized and hand-transcribed utterances representative of voice search traffic in Indic languages. The training set is augmented with several copies of the original, artificially corrupted by adding varying degrees of noise and reverberation using a room simulator such that the overall SNR varies between 0 and 20 db. The signal processing pipeline for all languages extracted 80-dimensional log mel-filter bank output features with a standard frame rate of 10 ms. The acoustic models for all languages are LSTMs with 5 layers, with each layer consisting of 768 LSTM cells. The acoustic models were trained in TensorFlow using asynchronous stochastic gradient descent minimizing Connectionist Temporal Classification (CTC) and state-level Minimum Bayesian Risk (sMBR) objective functions. The amount of training data used in the experiments for each of the Indic languages is presented in Table 4. The test data varied between 6,000 and 10,000 words. It can be seen that there is a huge variance in available data across these languages. A detailed analysis on Hindi is presented, as it is one of the languages that has the most code-switching with English and maximum number of training tokens. The Hindi training data set comprises of approximately 10,000 hours of training data from 10 million utterances. The proposed approach was also validated on the other Indic languages which typically have 10-20% of the data Hindi does.

TABLE 4

Training sets for the Indic languages

| Language | AM Training Utterances (M) | LM Training tokens |
| --- | --- | --- |
| Hindi | 10.1M | 7.7B |
| Bengali | 2.1M | 3.1B |
| Kannada | 0.7M | 0.6B |
| Gujarati | 1.4M | 0.8B |
| Tamil | 1.3M | 2.1B |
| Malayalam | 1.0M | 0.9B |
| Telugu | 1.6M | 1.2B |
| Marathi | 2.9M | 1.7B |
| Urdu | 0.2M | 0.3B |

Table 5 illustrates the significant differences in measured WER after correcting for errors related to the writing systems. The proposed toWER metric is computed after transliterating both the reference and hypothesis to one writing system corresponding to the native locale. It can be seen that there is a correlation between the percentage of Latin script and the proposed metric which serves as a good indication of the extent of code-switching in these languages. In languages such as Malayalam, Telugu, Marathi and Urdu, there is a lesser amount of code-switching than in languages such as Hindi and Bengali and toWER reflects that. Thus, transliteration can be a means to correct for errors in the writing system arising from inconsistencies and as a means for separating modeling errors from rendering errors. Transliterated scoring may reduce ambiguity introduced by code-switching and may smooth out ambiguities and transcription errors. Therefore, the proposed toWER is a better metric to evaluate any algorithmic improvements.

TABLE 5

Impact of toWER on fixing rendering errors while measuring WER on voice search queries on several Indic languages

| Language | Baseline WER (%) | toWER (%) | Amount of Latin (%) |
| --- | --- | --- | --- |
| Hindi | 31.5 | 20.6 | 31.9 |
| Bengali | 48.1 | 36.5 | 31.5 |
| Kannada | 36.4 | 28.1 | 20.9 |
| Gujarati | 38.1 | 30.3 | 7.3 |
| Tamil | 27.9 | 25.3 | 19.0 |
| Malayalam | 41.9 | 38.3 | 3.1 |
| Telugu | 31.2 | 31.1 | 3.5 |
| Marathi | 25.4 | 21.0 | 4.6 |
| Urdu | 25.1 | 23.4 | 0.4 |

Motivated by the impact of transliteration-optimized scoring, normalization of training data for language models using transliteration was also explored. First, the results of training transliterated language models (LMs) on Hindi is discussed. All the text from the diverse corpora used for building a Hindi language model were first transliterated to eliminate any Latin script. The normalized scripts in Devanagari were subsequently used to train 5-gram LMs for the first-pass and class-based maximum entropy based models for the second pass. Table 6 presents the results obtained when using these models to decode two different test sets comprising of voice search queries and dictation data. In order to compare with various writing systems as inputs to the language model, we define the Devanagari-only data based LM as an LM that was built with all utterances containing Devanagari script only. Any utterance containing bilingual text in Devanagari and Latin scripts was not used in the language model builds. As expected, this resulted in a loss of contextual modeling, lesser data and introduced mismatches between training and test set distributions. Transliterated scoring of the hypotheses produced by this LM fixes mismatches with reference transcriptions (row 2). Retaining data from both writing systems ensures that the contexts from code-switches are preserved but introduces all the challenges discussed in Section 2, including the same word appearing in both, Devanagari and Latin. With all the additional data from Latin included as-is in the LM, the mismatch between the reference and the hypothesis increases even more leading to an artificially inflated conventional WER (row 3). The toWER metric reflects the actual error rate (row 4). It can be seen that retraining LMs with all the data transliterated to Devanagari provides a significant gain on the voice search and dictation test sets (row 5). Thus, building LMs by transliterating all the training data to Devanagari, thereby introducing consistent text normalization, results in gains of 3 to 8% relative improvements in WER on the two test sets.

TABLE 6

Impact of transliteration on fixing modeling and rendering errors on voice search queries and dictation utterances in Hindi with Maximum Entropy based language models

| | Tasks | |
|---|---|---|
| Model | Voice Search (%) | Dictation (%) |
| Devanagari-only LM (WER) | 31.5 | 14.3 |
| Transliterated Scoring of Devanagari-only LM (toWER) | 20.6 | 13.5 |
| LM with Hindi and Latin scripts (WER) | 37.0 | 27.0 |
| LM with Hindi and Latin scripts (toWER) | 17.7 | 14.5 |
| Transliterated LM (toWER) | 17.2 | 12.7 |

The impact of transliteration on Long Short Term Memory (LSTM) neural network models was also explored. As seen in Table 7, training models with transliterated text provides gains in performance similar to those seen with maximum-entropy based LM for the voice search task and less so for the dictation task. While not surprising, it validates the hypothesis that transliteration based normalization for training as well as scoring helps separate modeling errors from rendering errors and helps with accurate evaluation of the performance of models. For the voice search task shown in Tables 6 and 7, one would conclude that the performance of an LSTM LM and a maximum entropy based LM are very similar (32.0 vs 31.5) when using conventional WER, while toWER would suggest that the maximum entropy based LM is much better than the LSTM (20.6 vs 22.3). The significance of such gains can in fact be measured by human raters in a side-by-side comparison study explained below.

Transliteration can also improve the accuracy of acoustic modeling. Various experiments were done using transliteration of each utterance in the training of acoustic models (AMs) on Hindi. All words in the AM training data written in Latin were first transliterated to Devanagari script and pronunciations were derived in the Hindi phonetic alphabet. After training the model to convergence using the CTC criterion, the transliterated AM showed small improvements in performance over the model trained with both writing systems (see Table 8). The improvements from sMBR training are expected to be even more significant as the numerator and denominator lattices needed for sMBR training will be consistently rendered in Devanagari script.

TABLE 7

Impact of transliteration on ASR performance on voice search queries and dictation utterances with LSTM LMs

| | Tasks | |
|---|---|---|
| Model | Voice Search (%) | Dictation (%) |
| Devanagari-only LM (WER) | 32.0 | 16.0 |
| Transliterated Scoring of Devanagari-only LM (toWER) | 22.3 | 15.3 |
| LM with Hindi and Latin scripts (toWER) | 20.7 | 14.9 |
| Transliterated LM (toWER) | 20.2 | 14.9 |

TABLE 8

Impact of the proposed approach on acoustic modeling

| Language | Baseline WER (%) | WER using transliterated AM (%) |
|---|---|---|
| Hindi | 21.9 | 21.3 |

Next, Table 9, shown below, presents the impact of the proposed approach on several other Indic languages. There is a significant, consistent gain on all languages except for Malayalam and Tamil. This can be attributed to the amount of Latin present in the training corpora. For these two languages, it can be seen from FIG. 2 that there is very little Latin present in the voice search corpus containing spoken queries, while the corpus containing web-based queries contains a lot more Latin. However, the web-based corpus received a very low interpolation weight for this task and therefore had very little impact on the WER. A similar trend is observed with transliterated LMs on the dictation task (See Table 10 with relative reductions in toWER of up to 10%.)

TABLE 10

ASR performance with transliterated LMs on a dictation task for several Indic languages

| Language | Baseline toWER (%) | Transliterated LMs toWER (%) |
|---|---|---|
| Hindi | 18.4 | 17.2 |
| Bengali | 36.5 | 30.5 |
| Kannada | 28.1 | 26.8 |
| Gujarati | 30.3 | 27.1 |
| Telugu | 31.1 | 30.1 |
| Urdu | 23.4 | 22.9 |
| Marathi | 21.0 | 20.8 |

TABLE 10-continued

ASR performance with transliterated LMs on a dictation task for several Indic languages

| Language | Baseline toWER (%) | Transliterated LMs toWER (%) |
|---|---|---|
| Tamil | 25.3 | 25.2 |
| Malayalam | 38.3 | 38.5 |

Figure 3:
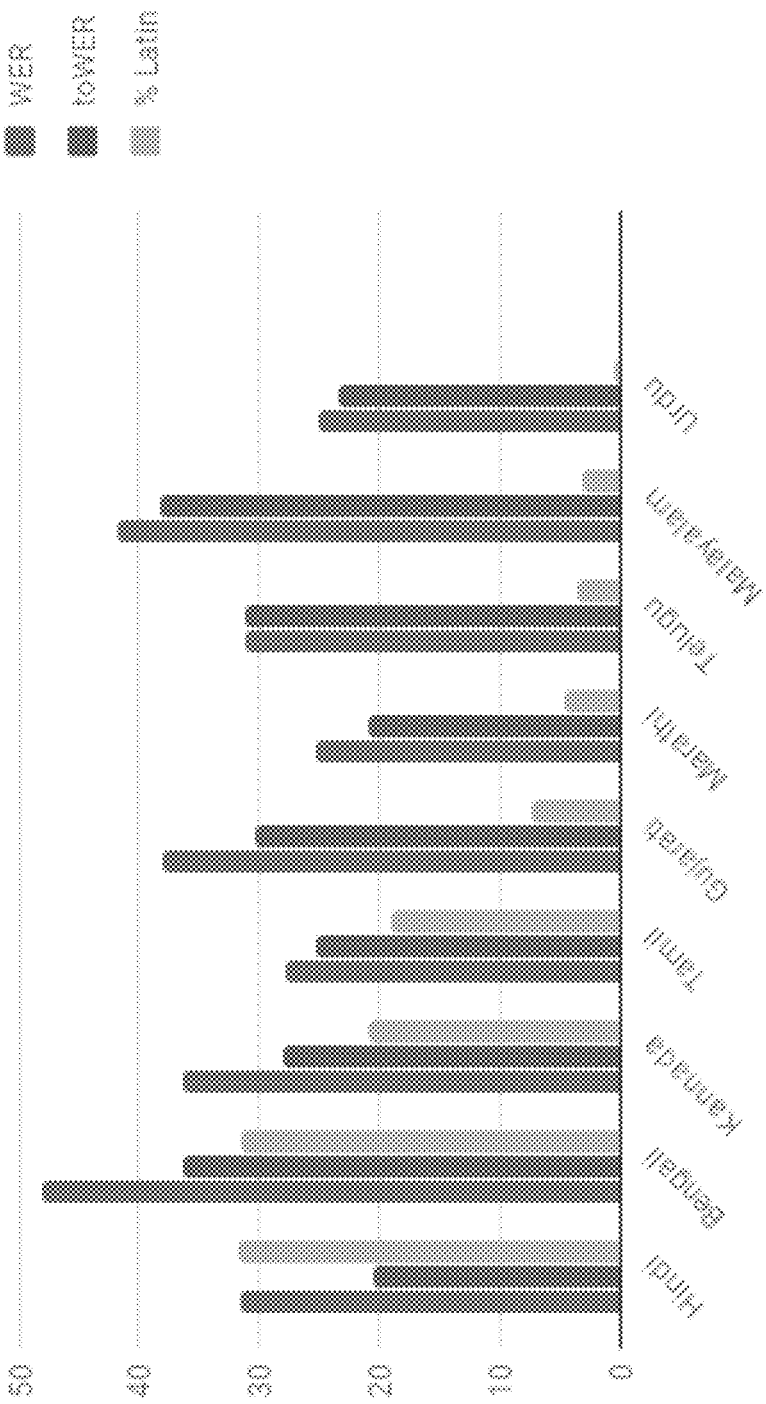
FIG. 3 is a chart illustrating error rates relative to amounts of code-switching in data sets.

FIG. 3 is a chart that illustrates WER values, toWER values, and correlation with the percentage of codeswitching measured as the percentage of Latin in the data.

Transliteration can result in positive and negative changes to recognition outcomes. Table 11 shows a couple of examples where the conventional WER metric artificially inflates the errors. In the first example, the utterance, Satta Matka is transcribed in Latin script while the ASR system hypothesized in Devanagari and therefore counts as two substitution errors. However, since toWER transliterates to Devanagari before computing the error rate, it correctly produces no errors. A similar scenario can be seen for the word Discovery in the second example.

TABLE 11

Sample errors fixed by toWER

| WER | toWER |
|---|---|
| Ref: Satta Matka | Ref: मट्टा मट्का |
| Hyp: मट्टा मट्का | Hyp: मट्टा मट्का |
| Ref: डिस्कवरी | Ref: डिस्कवरी |
| Hyp: Discovery | Hyp: डिस्कवरी |

However, not all issues with code-switching can be fixed with transliteration alone. A few such instances are highlighted in Table 12, where the transliteration process introduces errors which did not exist before. In the first example, the utterance in Latin reads as Tiger zinda hai full movie. The reference contained the first three words in Latin and the last two in Devanagari. As designed, the ASR hypothesis was in Devanagari. The result of transliterating both the reference and the hypothesis to a common Devanagari writing system, introduced an error Zinda vs Jinda. Similarly, in the second example, the reference was transliterated to Jamuna while the hypothesis produced Jumna which is a result of the ambiguity in the transliteration process wherein either forms are acceptable. The third example produces a more classic error. The utterance reads in Latin as BA first year time table. Note that in this example, the transcriber was consistent in producing text in Devanagari only. The ASR system hypothesized the utterance correctly but in a combination of writing systems and counted three substitution errors per the WER metric. In the process of transliterating the hypothesis, BA got mapped to Ba (pronounced as bah in the word 'bar') in Devanagari losing the 'A' at the end of this acronym BA. This causes a substitution error with the toWER metric. Despite situations such as those highlighted above, overall, the proposed metric does indeed reflect the performance of the system significantly more accurately than the conventional WER.

TABLE 12

Sample errors introduced by toWER

| WER | toWER |
|---|---|
| Ref: Tiger Zinda Hai फ़ुल् मूवी | टैगर् ज़िन्दा है फ़ुल् मूवी |
| Hyp: टैगर् जिन्दा है फ़ुल् मूवी | टैगर् जिन्दा है फ़ुल् मूवी |
| Ref: Ganga Jumna | गन्गा जमुना |
| Hyp: गं गा जुम्ना | गन्गा जुम्ना |
| Ref: बीए फ़र्स्ट् ईयर् टाइम् टेबल् | बीए फ़र्स्ट् ईयर् टाइम् टेबल् |
| Hyp: B.A. फ़र्स्ट् ईयर् time table | बा फ़र्स्ट् ईयर् टाइम् टेबल् |

As an additional evaluation of the proposed approach, several "side-by-side" (SxS) experiments were conducted, in which each anonymized test utterance is automatically transcribed by two ASR systems (Baseline vs. Transliterated LM). If the two hypotheses differ, they are presented to human raters. SxS experiments can accurately measure semantic changes as opposed to minor lexical differences. We conduct SxS experiments also for the scenario where the hypothesis is generated by a single ASR system, but the raters see the raw hypothesis in multiple writing systems as well as in a single native writing system (Devanagari in this example). In Table 13, the following results on 500 differing utterances are presented: (1) Change: the percentage of traffic for which the two systems produced different transcripts. (2) Wins/Losses: the ratio of wins to losses in the experimental system vs. The baseline. A p-value less than <5% is considered to be statistically significant.

From Table 13, it is evident that the human raters give a neutral rating to the transliterated hypothesis when compared to the mixed writing systems based hypothesis. This is not unexpected, as the semantic content of the two systems being compared has not changed. However, toWER smooths out the rendering errors and offers a better perspective. In a similar vein, the second row compares two LMs, baseline system (row 2 in Table 6 with a toWER of 20.6%) and the system with a transliterated LM (row 4 in Table 6 with a toWER of 17.2%). There are far more wins than losses with the transliterated LM (the experimental system).

TABLE 13

Human Raters judging of toWER and transliterated LMs results

| Hindi Systems Compared | Traffic Changed (%) | Win/Loss/Neutral | p-Value |
|---|---|---|---|
| Raw vs transliterated Hypothesis | 12.7 | 0/3/497 | 1%-2% |
| Baseline vs transliterated LM | 36.6 | 57/37/406 | >=5% |

All Indic languages showed a correlation between the amount of text written in Latin and the gains obtained with transliterated LMs and toWER metric on the voice search task. However, there was a degradation in performance on the dictation task in Kannada. To better understand the source of these errors, the grapheme error rate was generated in the transliterated space for Kannada and compared it with a language such as, Bengali, which showed significant gain with transliterated LMs.

Interestingly enough, it can be seen from Table 14 that the number of deletion errors between the baseline and the transliterated LM is much higher in Kannada (increased by 30% relative) than in Bengali (stayed constant). The substitution errors also increased in Kannada by approximately 3% relative, while they decreased by 6.4% relative in Bengali. However, while the grapheme error rate for Bengali reduced from 18.7% to 17.6% with the transliterated LM, it only reduced from 10.27 to 10.23 for Kannada. A closer observation of the hypotheses indicates that many of the errors were either introduced by transliteration when two words are merged into one or were a result of ambiguity from the language where both merged and split forms are considered correct. A combination of these factors ends up degrading toWER. The improvement in grapheme error rate is a good indication that transliterated LMs are still useful. Some of the errors caused by the transliteration process can likely be corrected by training a model on matched data.

TABLE 14

Grapheme Error Rate, Deletion and Substitution Errors on the dictation task in Bengali and Kannada. All numbers in %.

| Error Type | LM | Languages | |
|---|---|---|---|
| | | Kannada | Bengali |
| Grapheme Error Rate | Baseline | 10.27 | 8.0 |
| | Transliterated LM | 10.23 | 7.4 |
| Deletion Errors | Baseline | 4.3 | 3.0 |
| | Transliterated LM | 5.6 | 3.0 |
| Substitution Errors | Baseline | 14.5 | 14.1 |
| | Transliterated LM | 14.9 | 13.0 |

In short, the conventional Word Error Rate (WER) metric is not sufficient for measuring the performance of code-mixed languages due to ambiguities in transcription, misspellings and borrowing of words from two different writing systems. Modeling errors can be accurately measured using the proposed transliteration-based "toWER" metric that smooths out the rendering errors. Consistent normalization of training transcripts for both language and acoustic modeling can provide significant gains of up to 10% relative across several code-switched Indic languages using voice search and dictation traffic. With a simple approach based on transliteration to consistently normalize training data and accurately measuring the robustness and accuracy of the model, significant gains can be obtained.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The computer readable medium may be a transitory medium, such as an electrical, optical or electromagnetic signal. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

The invention claimed is:

1. A method performed by one or more computers, the method comprising:
   accessing, by the one or more computers, a set of data indicating language examples for a first script, wherein at least some of the language examples include words in the first script and out-of-script words in one or more other scripts;
   accessing, by the one or more computers, a blacklist of terms in a script different than the first script;
   selectively transliterating, by the one or more computers, at least portions of some of the language examples by transliterating a portion of the out-of-script words to the first script and bypassing transliteration of a remaining portion of the out-of-script words that includes instances of the terms from the blacklist to generate a training data set having the portion of the out-of-script words transliterated into the first script and the remaining portion of the out-of-script words kept in the one or more other scripts; and
   generating, by the one or more computers, a speech recognition model based on occurrences of sequences of words in the training data set having the portion of the out-of-script words transliterated into the first script and the remaining portion of the out-of-script words kept in the one or more other scripts.

2. The method of claim 1, wherein the speech recognition model is a language model, an acoustic model, a sequence-to-sequence model, or an end-to-end model.

3. The method of claim 1, wherein selectively transliterating comprises mapping different tokens that represent text from different scripts to a single normalized transliterated representation.

4. The method of claim 1, wherein selectively transliterating the language examples comprises transliterating the portion of the out-of-script words in the language examples that are not in the first script into the first script.

5. The method of claim 1, wherein selectively transliterating the language examples comprises generating altered language examples in which words written in a second script different from the first script are replaced with one or more words in the first script that approximate acoustic properties of the word in the second script.

6. The method of claim 5, wherein the words written in the second script are individually transliterated into the first script on a word-by-word basis.

7. The method of claim 1, further comprising:
   determining a test set of language examples with which to test the speech recognition model;
   generating a normalized test set by transliterating into the first script words of the language examples in the test set that are not written in the first script;
   obtaining output of the speech recognition model corresponding to the language examples in the test set;
   normalizing output of the speech recognition model by transliterating into the first script words of the speech recognition model output that are not written in the first script; and
   determining an error rate of the speech recognition model based on a comparison of the normalized test set with the normalized speech recognition model output.

8. The method of claim 7, wherein the error rate is a word error rate, and wherein the method includes, based on the word error rate:
   determining whether to continue training or terminate training of the speech recognition model;
   altering a training data set used to train the speech recognition model;
   setting a size, structure, or other characteristic of the speech recognition model; or
   selecting one or more speech recognition models for a speech recognition task.

9. The method of claim 1, further comprising determining a modelling error rate for the speech recognition model in which acoustically similar words written in any of multiple scripts are accepted as correct transcriptions, without penalizing output of a word in a different script than a corresponding word in a reference transcription.

10. The method of claim 9, further comprising determining a rendering error rate for the speech recognition model that is a measure of differences between a script of words in the output of the speech recognition model relative to a script of corresponding words in reference transcriptions.

11. The method of claim 1, wherein selectively transliterating is performed using a finite state transducer network trained to perform transliteration into the first script.

12. The method of claim 1, wherein selectively transliterating comprises, for at least one language example, performing multiple rounds of transliteration between scripts to reach a transliterated representation in the first script that is included in the training data set in the first script.

13. The method of claim 1, further comprising determining a score indicating a level of mixing of scripts in the language examples; and
based on the score:
selecting a parameter for pruning a finite state transducer network for transliteration;
selecting a parameter for pruning the speech recognition model; or
selecting a size or structure for the speech recognition model.

14. The method of claim 1, wherein generating the speech recognition model comprises:
after selectively transliterating at least portions of some the language examples by transliterating the portion of the out-of-script words to the first script, determining, by the one or more computers, a count of occurrences of different sequences of words in the training data set in the first script; and
generating, by the one or more computers, a speech recognition model based on the counts of occurrences of the different sequences of words in the training data set in the first script.

15. The method of claim 1, wherein the speech recognition model comprises a recurrent neural network, and generating the speech recognition model comprises training the recurrent neural network.

16. The method of claim 1, further comprising using, by the one or more computers, the model to perform speech recognition for an utterance.

17. The method of claim 1, further comprising:
receiving, by one or more computers, audio data representing an utterance; and
using, by the one or more computers, the speech generation model to map the audio data to text representing the utterance.

18. A system comprising:
one or more computers; and
one or more computer-readable media storing instructions that, when executed by the one or more computers, cause the one or more computers to perform operations comprising:
accessing a set of data indicating language examples for a first script, wherein at least some of the language examples include words in the first script and out-of-script words in one or more other scripts;
accessing a blacklist of terms in a script different than the first script;
selectively transliterating at least portions of some of the language examples by transliterating a portion of the out-of-script words to the first script and bypassing transliteration of a remaining portion of the out-of-script words that includes instances of the terms from the blacklist to generate a training data set having the portion of the out-of-script words transliterated into the first script and the remaining portion of the out-of-script words kept in the one or more other scripts; and
generating a speech recognition model based on occurrences of sequences of words in the training data set having the portion of the out-of-script words transliterated into the first script and remaining portion of the out-of-script words kept in the one or more other scripts.

19. One or more non-transitory computer-readable media storing instructions that, when executed by the one or more computers, cause the one or more computers to perform operations comprising:
accessing a set of data indicating language examples for a first script, wherein at least some of the language examples include words in the first script and out-of-script words in one or more other scripts;
accessing a blacklist of terms in a script different than the first script
selectively transliterating at least portions of some of the language examples by transliterating a portion of the out-of-script words to the first script and bypassing transliteration of a remaining portion of the out-of-script words that includes instances of the terms from the blacklist to generate a training data set having the portion of the out-of-script words transliterated into the first script and the remaining portion of the out-of-script words kept in the one or more other scripts; and
generating a speech recognition model based on occurrences of sequences of words in the training data set having the portion of the out-of-script words transliterated into the first script and remaining portion of the out-of-script words kept in the one or more other scripts.

* * * * *